US010012212B2

(12) United States Patent
Kacmarcik et al.

(10) Patent No.: US 10,012,212 B2
(45) Date of Patent: Jul. 3, 2018

(54) SENSOR ASSEMBLY FOR A WIND TURBINE BEARING AND RELATED SYSTEM AND METHOD

(71) Applicant: General Electric Company, Schenectady, NY (US)

(72) Inventors: Michael J. Kacmarcik, Simpsonville, SC (US); John Robert Inman, Mauldin, SC (US)

(73) Assignee: General Electric Company, Schenectady, NY (US)

( * ) Notice: Subject to any disclaimer, the term of this patent is extended or adjusted under 35 U.S.C. 154(b) by 280 days.

(21) Appl. No.: 14/873,644

(22) Filed: Oct. 2, 2015

(65) Prior Publication Data

US 2017/0096984 A1   Apr. 6, 2017

(51) Int. Cl.
*F03D 11/00* (2006.01)
*F03D 7/02* (2006.01)
*F16C 19/18* (2006.01)
*F16C 19/52* (2006.01)
*F03D 80/70* (2016.01)

(52) U.S. Cl.
CPC ........... *F03D 7/0224* (2013.01); *F03D 80/70* (2016.05); *F16C 19/184* (2013.01); *F16C 19/522* (2013.01); *F05B 2240/50* (2013.01); *F05B 2260/80* (2013.01); *F16C 2360/31* (2013.01)

(58) Field of Classification Search
CPC ...... F03D 7/0224; F03D 80/70; F16C 19/184; F16C 19/52; F16C 19/522; F16C 2360/31; F05B 2240/50; F05B 2260/80
See application file for complete search history.

(56) References Cited

U.S. PATENT DOCUMENTS

| 5,503,030 A | 4/1996 | Bankeström |
| 6,490,935 B1 | 12/2002 | Joki et al. |
| 7,444,888 B2 | 11/2008 | Mol et al. |

FOREIGN PATENT DOCUMENTS

DE   102012202522 A1 *   8/2013   ............ F16C 41/004

* cited by examiner

*Primary Examiner* — Richard Edgar
(74) *Attorney, Agent, or Firm* — Dority & Manning, P.A.

(57) ABSTRACT

A bearing for a wind turbine may generally include an outer race, an inner race and a plurality of roller elements positioned radially between the inner and outer races, with the roller elements including a first roller element and a second roller element. The bearing may also include a sensor assembly having a load sensor positioned between the first and second roller elements. When the sensor assembly is compressed between the first and second roller elements during operation of the wind turbine, the load sensor is configured to detect a compressive load transferred through the sensor assembly.

19 Claims, 8 Drawing Sheets

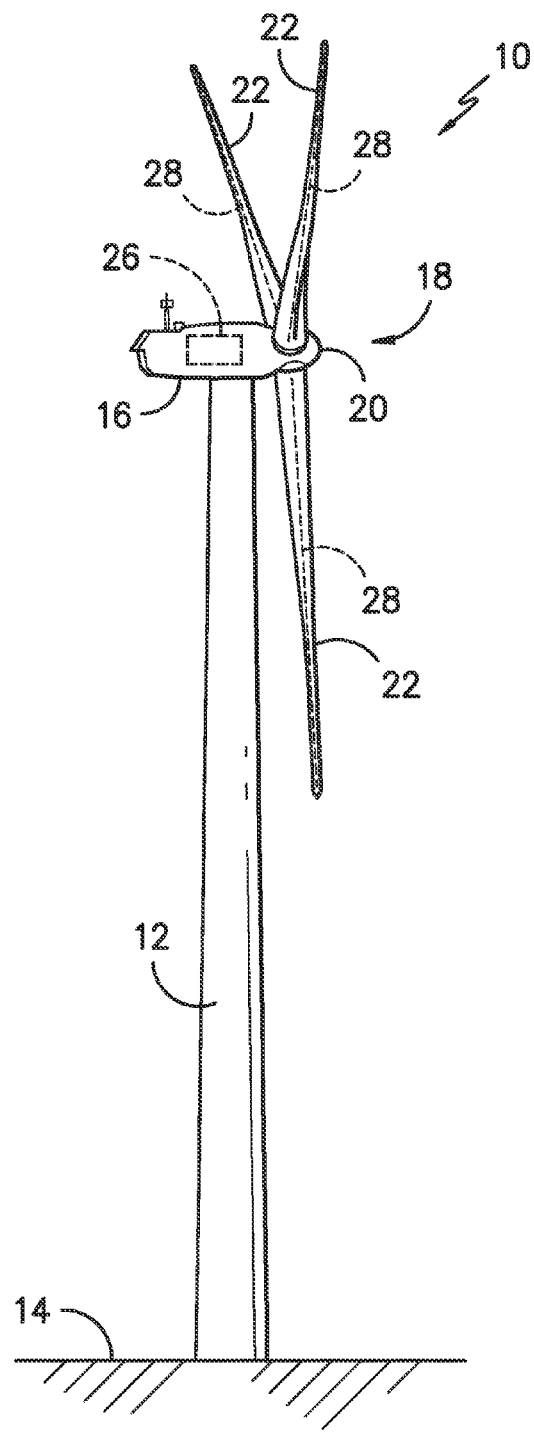
FIG. -1-

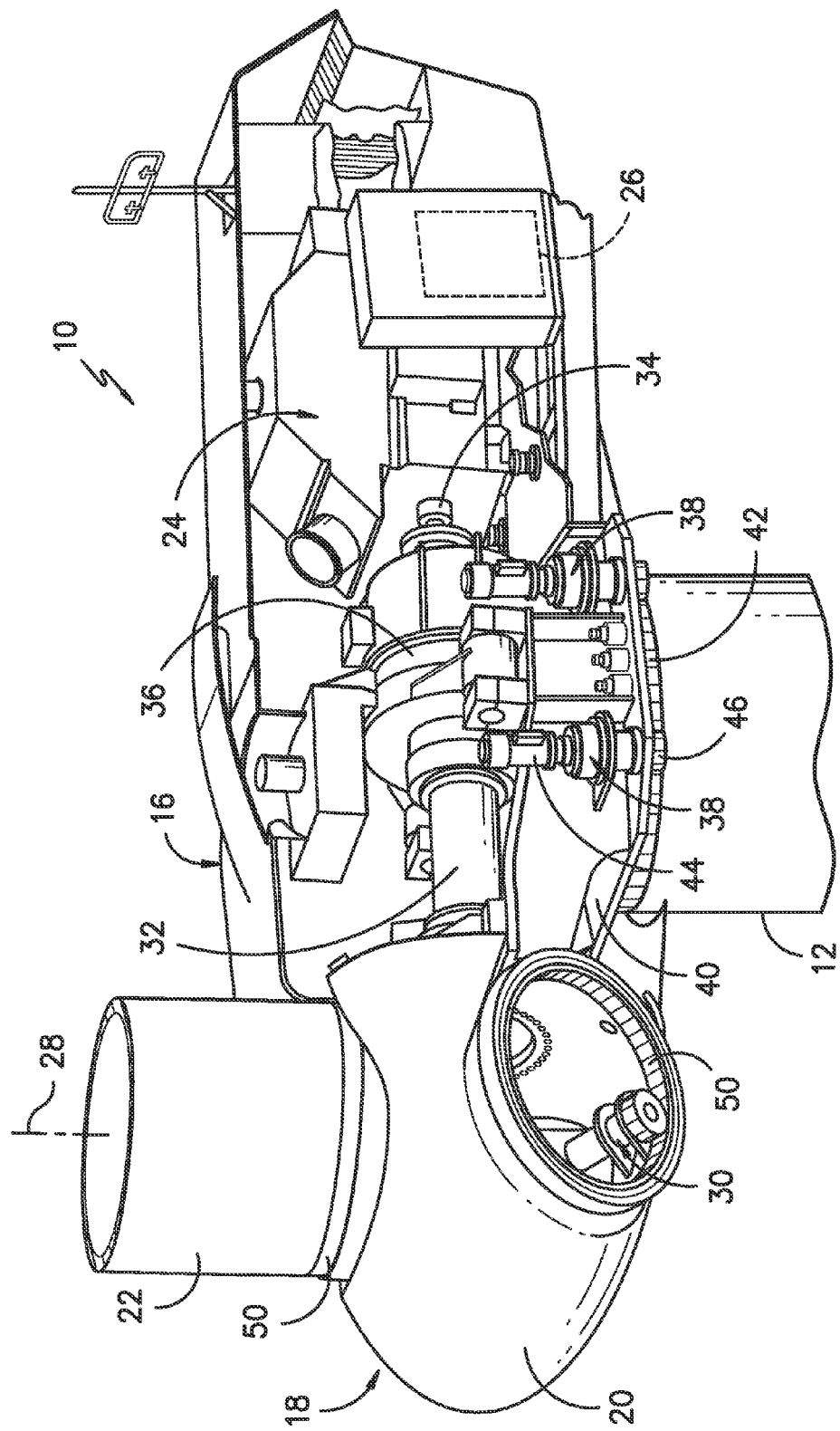

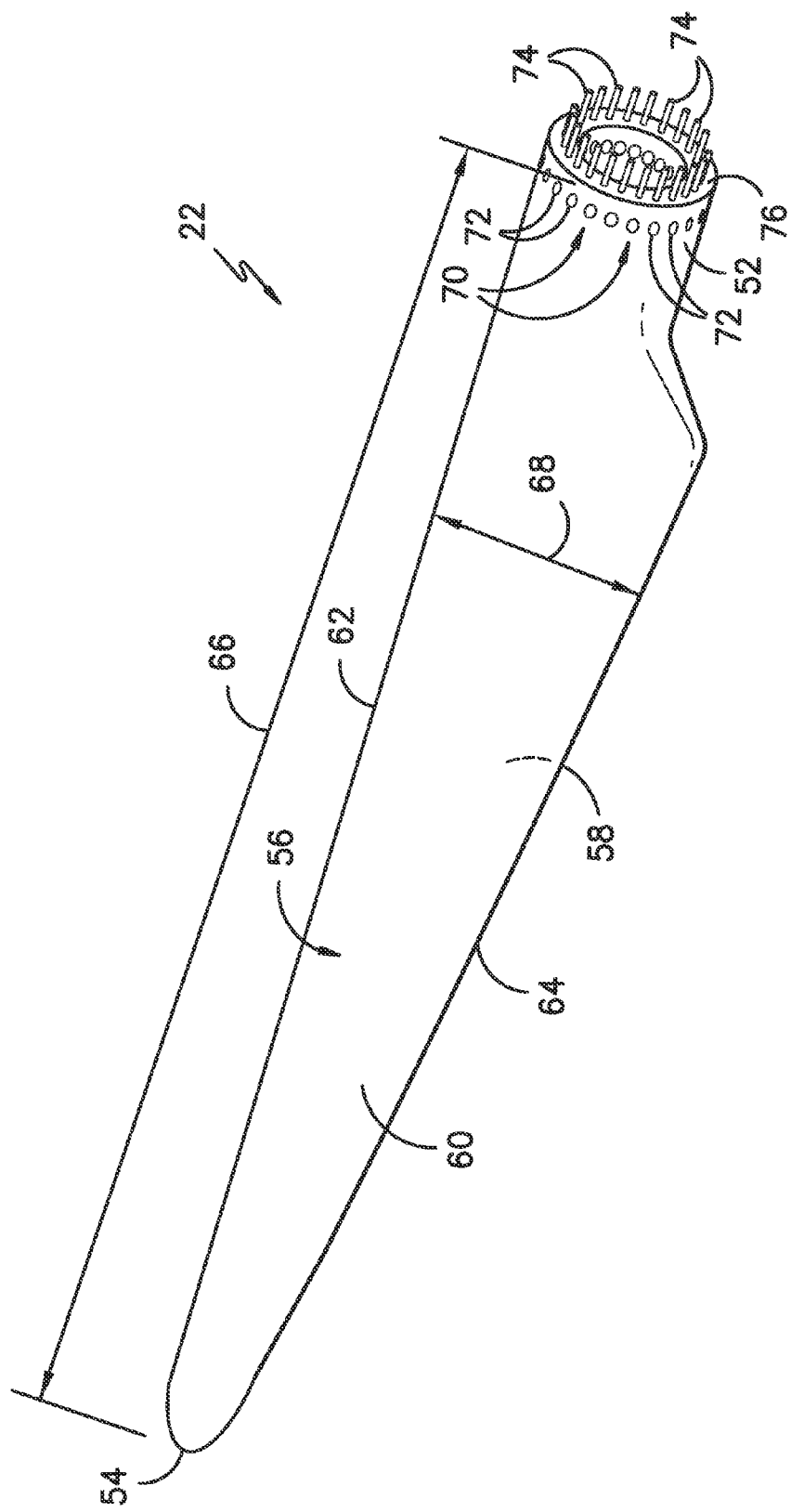
FIG. -3-

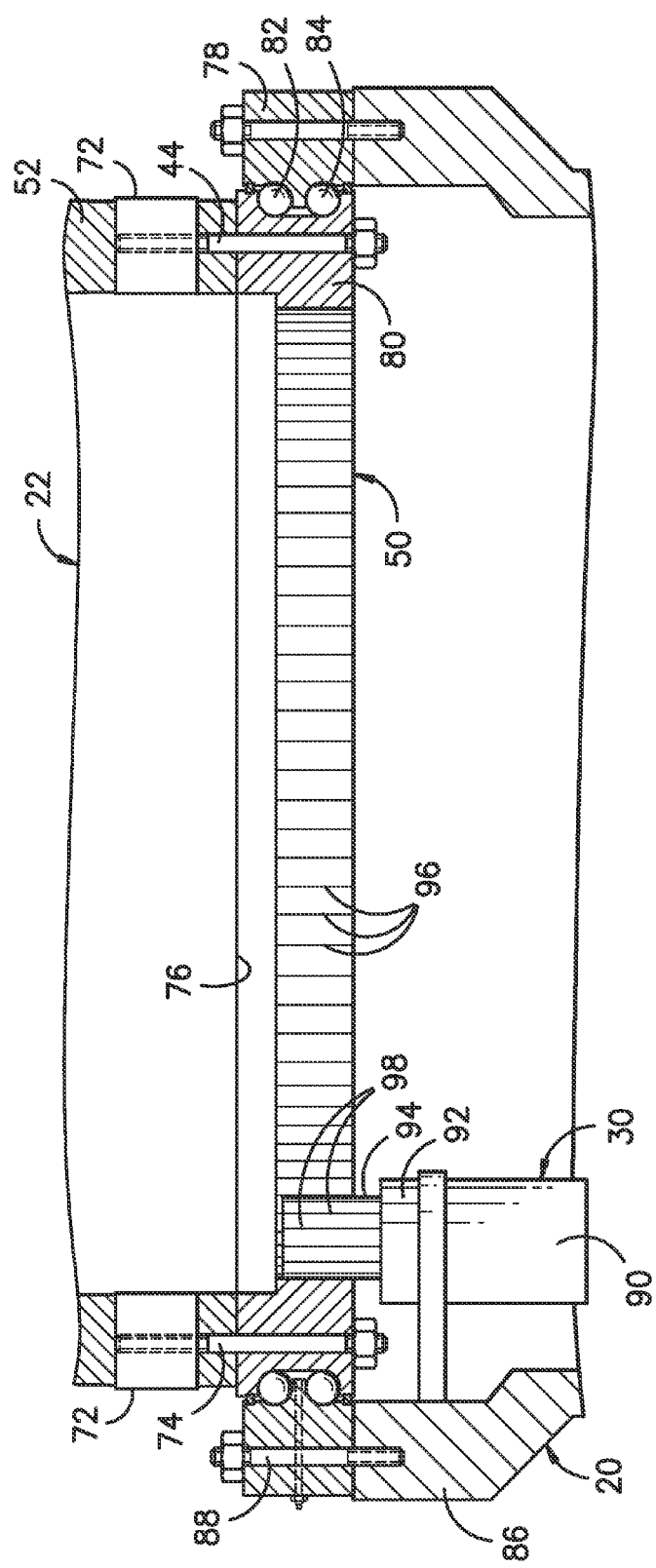
FIG. -4-

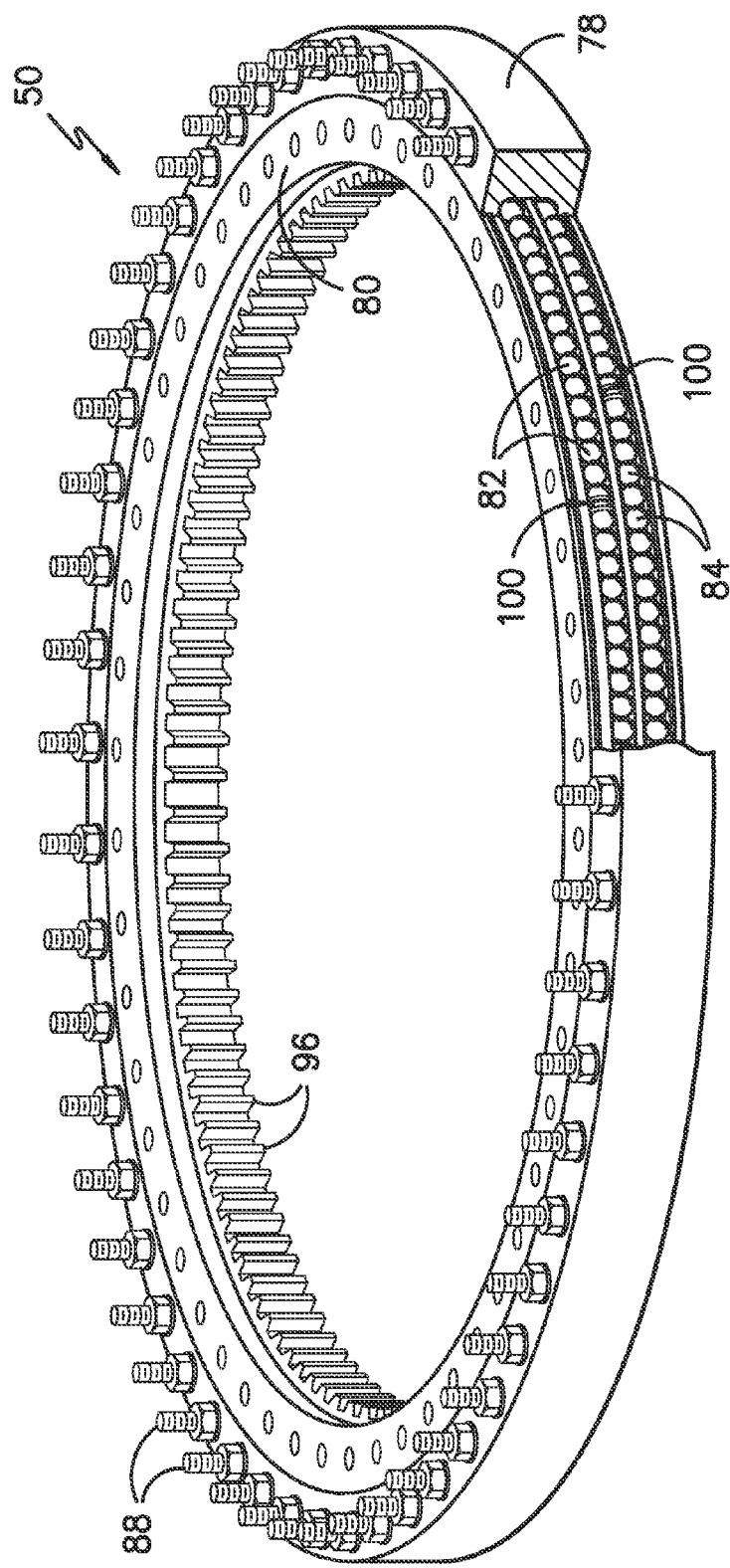
FIG. -5-

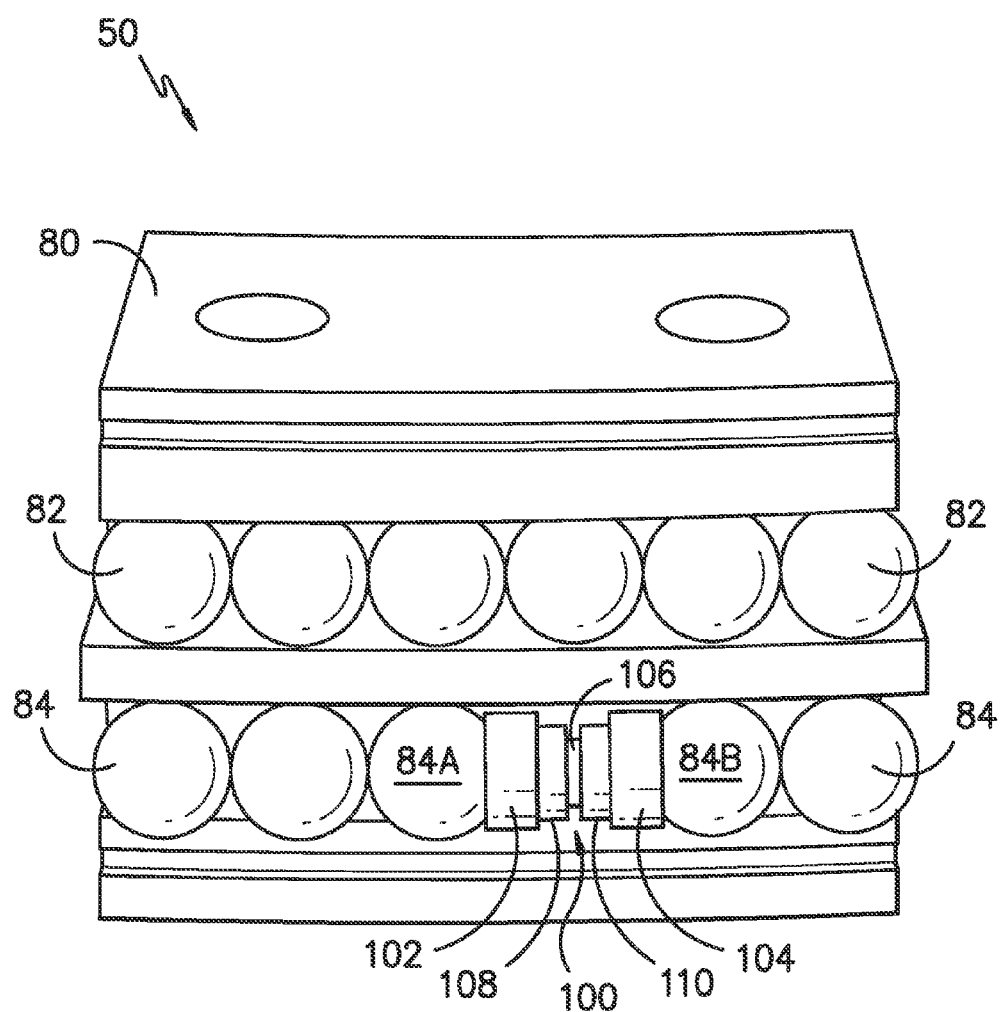
FIG. -6-

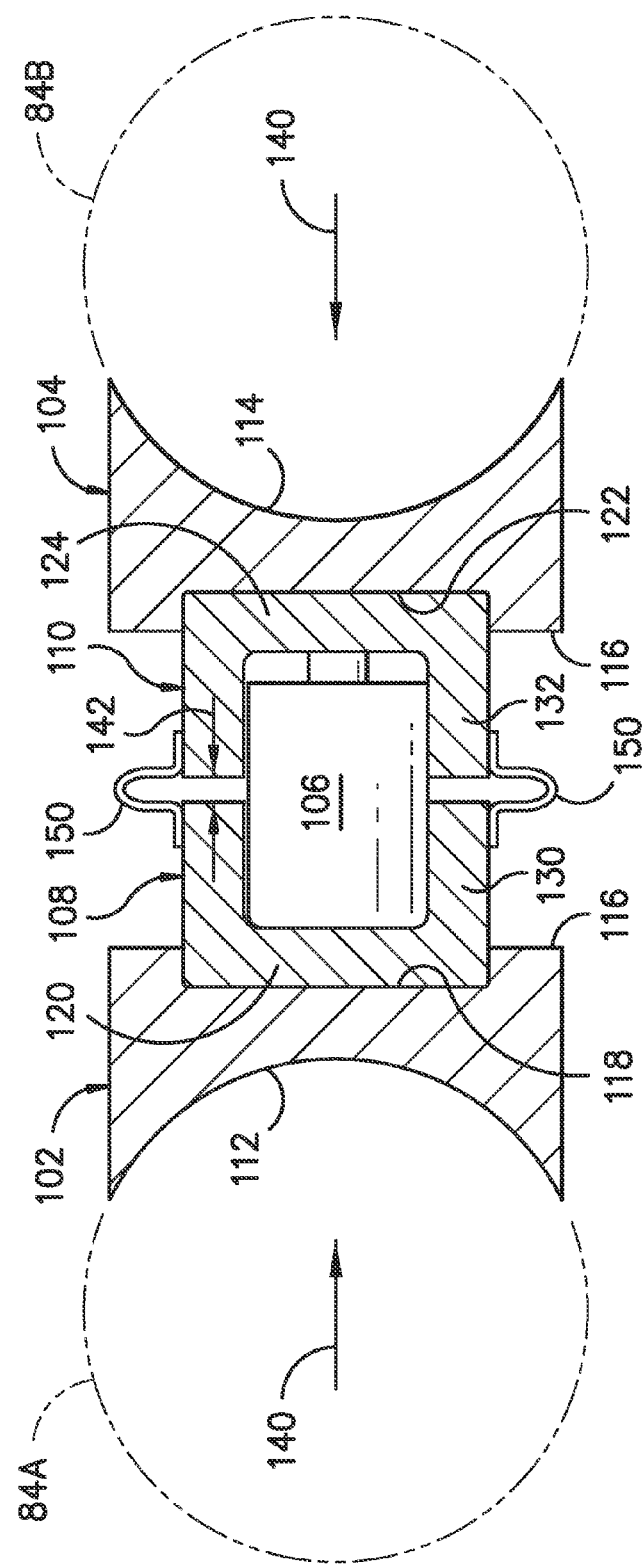

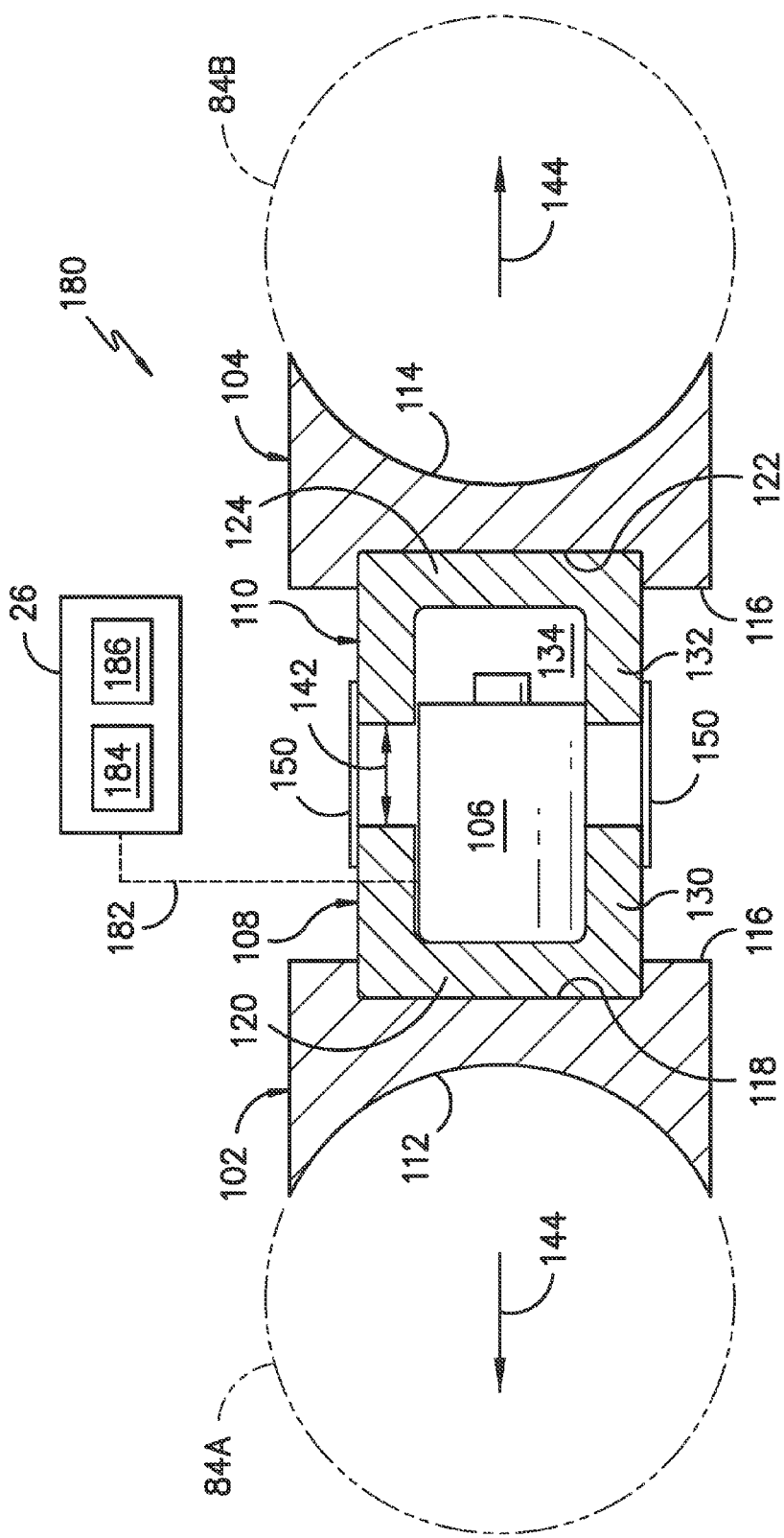
FIG. -8-

SENSOR ASSEMBLY FOR A WIND TURBINE BEARING AND RELATED SYSTEM AND METHOD

FIELD OF THE INVENTION

The present subject matter relates generally to bearings configured for use with wind turbines and, more particularly, to a system and method that utilizes a sensor assembly to monitor compressive loads between adjacent roller elements of a wind turbine bearing.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. One such modification has been to increase the length of the rotor blades. However, as is generally understood, the loading on a rotor blade is a function of blade length, along with wind speed and turbine operating states. Thus, longer rotor blades may be subject to increased loading, particularly when a wind turbine is operating in high-speed wind conditions.

During the operation of a wind turbine, the loads acting on a rotor blade are transmitted through the blade and into the blade root. Thereafter, the loads are transmitted through a pitch bearing disposed at the interface between the rotor blade and the wind turbine hub. As a result, the pitch bearings are often subjected to extreme, varying and/or opposing loads. For example, the pitch bearing experiences a large, dynamic bending load due to a gravity load vector that reverses with each revolution of the rotor. When such a large, dynamic bending load is combined with the continuous pitch adjustments made to the rotor blade during each revolution of the rotor, sections of the roller elements contained within the bearing tend to migrate towards one another, thereby generating a high circumferential compressive load between the roller elements. Such compressive loads can lead to damage to one or more of the pitch bearing components.

Accordingly, a sensor assembly and a related system and method that allow compressive loads between adjacent roller elements of a wind turbine bearing to be monitored would be welcomed in technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a bearing for a wind turbine. The bearing may generally include an outer race, an inner race and a plurality of roller elements positioned radially between the inner and outer races, with the roller elements including a first roller element and a second roller element. The bearing may also include a sensor assembly having a load sensor positioned between the first and second roller elements. When the sensor assembly is compressed between the first and second roller elements during operation of the wind turbine, the load sensor is configured to detect a compressive load transferred through the sensor assembly.

In another aspect, the present subject matter is directed to a system for monitoring bearing loads within a wind turbine. The system may generally include a bearing having an outer race, an inner race and a plurality of roller elements positioned radially between the inner and outer races, with the roller elements including a first roller element and a second roller element. The system may also include a sensor assembly having a load sensor positioned between the first and second roller elements. The load sensor may be configured to detect a compressive load transmitted through the sensor assembly when the sensor assembly is compressed between the first and second roller elements. In addition, the system may include a controller communicatively coupled to the sensor assembly. The controller may be configured to receive load measurements from the load sensor, with the load measurements being associated with the compressive load transmitted through the sensor assembly.

In a further aspect, the present subject matter is directed to a method for monitoring loads within a bearing of a wind turbine, wherein the bearing includes an outer race, an inner race and a plurality of roller elements positioned radially between the inner and outer races. The method may generally include receiving a signal from a sensor assembly associated with a compressive load transferred between a first roller element and a second roller element of the roller elements, wherein the sensor assembly includes a load sensor configured to detect the compressive load. In addition, the method may include comparing the compressive load to a predetermined load threshold defined for the bearing and, if the compressive load exceeds the predetermined load threshold, adjusting the operation of the wind turbine so as to reduce the compressive load.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine;

FIG. 2 illustrates a perspective, internal view of the nacelle of the wind turbine shown in FIG. 1;

FIG. 3 illustrates a perspective view of one of the rotor blades of the wind turbine shown in FIG. 1;

FIG. 4 illustrates a cross-sectional view of a portion of the wind turbine shown in FIG. 1, particularly illustrating a rotor blade coupled to the hub via a pitch bearing;

FIG. 5 illustrates a perspective, partially cut-away view of the pitch bearing shown in FIG. 4, particularly illustrating the pitch bearing including one or more sensor assemblies installed therein for monitoring the compressive loads between adjacent roller elements of the bearing;

FIG. 6 illustrates a close-up view of a portion of the pitch bearing shown in FIG. 5, particularly illustrating a sensor assembly installed between adjacent roller elements of the bearing;

FIG. 7 illustrates a cross-sectional view of the sensor assembly shown in FIG. 6, particularly illustrating the sensor assembly in a compressed or loaded state; and FIG. 8 illustrates another cross-sectional view of the sensor assembly shown in FIG. 6, particularly illustrating the sensor assembly in a non-compressed or unloaded state.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method that utilizes a sensor assembly for monitoring compressive loads within a bearing of a wind turbine. Specifically, in several embodiments, one or more sensor assemblies may be installed within a wind turbine bearing, with each sensor assembly being positioned between adjacent roller elements of the bearing. Each sensor assembly may include a load sensor configured to detect the loads transmitted though the sensor assembly as the adjacent roller elements are compressed against the assembly during operation of the wind turbine. The monitored compressive loads may then be transmitted to a suitable computing device, such as the turbine controller, to allow such loads to be actively monitored by the device/controller. For instance, in one embodiment, the turbine controller may compare the monitored load to a predetermined load threshold defined for the bearing. If the monitored load exceeds the predetermined load threshold, the controller may be configured to adjust the operation of the wind turbine so as to reduce the compressive load within the bearing, such as by adjusting the pitching algorithm/schedule for the rotor blades.

Referring now to the drawings, FIG. 1 illustrates a side view of one embodiment of a wind turbine 10. As shown in FIG. 1, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a turbine control system or turbine controller 26 centralized within the nacelle 16 (or disposed at any other suitable location within and/or relative to the wind turbine 10). In general, the turbine controller 26 may comprise a computing device or other suitable processing unit. Thus, in several embodiments, the turbine controller 26 may include suitable computer-readable instructions that, when implemented, configure the controller 26 to perform various different functions, such as receiving, transmitting and/or executing wind turbine control signals. As such, the turbine controller 26 may generally be configured to control the various operating modes (e.g., start-up or shut-down sequences) and/or components of the wind turbine 10. For example, the controller 26 may be configured to adjust the blade pitch or pitch angle of each rotor blade 22 (i.e., an angle that determines a perspective of the blade 22 with respect to the direction of the wind) about its pitch axis 28 in order to control the rotational speed of the rotor blade 22 and/or the power output generated by the wind turbine 10. For instance, the turbine controller 26 may control the pitch angle of the rotor blades 22, either individually or simultaneously, by transmitting suitable control signals to one or more pitch drives or pitch adjustment mechanisms 30 (FIG. 2) of the wind turbine 10.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a rotor shaft 32 coupled to the hub 20 for rotation therewith. The generator 24 may then be coupled to the rotor shaft 32 such that rotation of the rotor shaft 32 drives the generator 24. For instance, in the illustrated embodiment, the generator 24 includes a generator shaft 34 rotatably coupled to the rotor shaft 32 through a gearbox 36. However, in other embodiments, it should be appreciated that the generator shaft 34 may be rotatably coupled directly to the rotor shaft 32. Alternatively, the generator 24 may be directly rotatably coupled to the rotor shaft 32 (often referred to as a "direct-drive wind turbine").

Additionally, as indicated above, the turbine controller 26 may also be located within the nacelle 16 (e.g., within a control box or panel). However, in other embodiments, the controller 26 may be located within any other component of the wind turbine 10 or at a location outside the wind turbine (e.g., when the controller 26 is configured as a farm controller for controlling a plurality of wind turbines). As is generally understood, the controller 26 may be communicatively coupled to any number of the components of the wind turbine 10 in order to control the operation of such components. For example, as indicated above, the controller 26 may be communicatively coupled to each pitch adjustment mechanism 30 of the wind turbine 10 (one for each rotor blade 22) via a pitch controller (not shown) to facilitate rotation of each rotor blade 22 about its pitch axis 28.

Moreover, the wind turbine 10 may include one or more yaw drive mechanisms 38 mounted to and/or through a bedplate 40 positioned atop the wind turbine tower 12. Specifically, each yaw drive mechanism 38 may be mounted to and/or through the bedplate 40 so as to engage a yaw bearing 42 coupled between the bedplate 40 and the tower 12. The yaw bearing 42 may be mounted to the bed plate 40 such that, as the yaw bearing 42 rotates about a yaw axis (not shown) of the wind turbine 10, the bedplate 40 and, thus, the nacelle 16 are similarly rotated about the yaw axis.

In general, it should be appreciated that the yaw drive mechanisms 38 may have any suitable configuration and may include any suitable components known in the art that allow such mechanisms 38 to function as described herein. For example, as shown in FIG. 2, each yaw drive mechanism 38 may include a yaw motor 44 mounted to the bedplate 40. The yaw motor 44 may be coupled to a yaw gear 46 (e.g., a pinion gear) configured to engage the yaw bearing 42. For instance, the yaw motor 44 may be coupled to the yaw gear 46 directly (e.g., by an output shaft (not shown) extending through the bedplate 40) or indirectly through a suitable gear assembly coupled between the yaw motor 44 and the yaw gear 46. As such, the torque generated by the yaw motor 44 may be transmitted through the yaw gear 46 and applied to the yaw bearing 42 to permit the nacelle 16 to be rotated about the yaw axis of the wind turbine 10. It should be appreciated that, although the illustrated wind turbine 10 is shown as including two yaw drive mechanisms 38, the wind turbine 10 may generally include any suitable number of yaw drive mechanisms 38.

Similarly, it should be appreciated that the yaw bearing 42 may generally have any suitable configuration. For instance, in several embodiments, the yaw bearing 42 may include an inner race and an outer race rotatable relative to the inner race, with one or more rows of roller elements being disposed between the inner and outer races. In such embodiments, the yaw gear 42 may be configured to engage the outer race of the yaw bearing 42 such that the outer race is rotated relative to the inner race to adjust the orientation of the nacelle 16 relative to the direction of the wind.

Referring still to FIG. 2, the wind turbine 10 may also include a plurality of pitch bearings 50, with each pitch bearing 50 being coupled between the hub 20 and one of the rotor blades 22. As will be described below, the pitch bearings 50 may be configured to allow each rotor blade 22 to be rotated about its pitch axis 28 (e.g., via a pitch adjustment mechanism 30), thereby allowing the orientation of each blade 22 to be adjusted relative to the direction of the wind.

It should be appreciated that the term "slewring bearing" may be used to refer to the yaw bearing 42 of the wind turbine 10 and/or one of the pitch bearings 50 of the wind turbine 10.

Referring now to FIG. 3, a perspective view of one of the rotor blades 22 shown in FIGS. 1 and 2 is illustrated in accordance with aspects of the present subject matter. As shown, the rotor blade 22 includes a blade root 52 configured for mounting the rotor blade 22 to the hub 20 of the wind turbine 10 (FIG. 1) and a blade tip 54 disposed opposite the blade root 52. A body 56 of the rotor blade 22 may extend lengthwise between the blade root 52 and the blade tip 54 and may generally serve as the outer shell of the rotor blade 22. As is generally understood, the body 56 may define an aerodynamic profile (e.g., by defining an airfoil shaped cross-section, such as a symmetrical or cambered airfoil-shaped cross-section) to enable the rotor blade 22 to capture kinetic energy from the wind using known aerodynamic principles. Thus, the body 56 may generally include a pressure side 58 and a suction side 60 extending between a leading edge 62 and a trailing edge 64. Additionally, the rotor blade 22 may have a span 66 defining the total length of the body 56 between the blade root 52 and the blade tip 54 and a chord 68 defining the total length of the body 56 between the leading edge 62 and the trailing edge 64. As is generally understood, the chord 68 may vary in length with respect to the span 66 as the body 56 extends from the blade root 52 to the blade tip 54.

Moreover, as shown, the rotor blade 22 may also include a plurality of T-bolts or root attachment assemblies 70 for coupling the blade root 52 to the hub 20 of the wind turbine 10. In one embodiment, each root attachment assembly 70 may include a barrel nut 72 mounted within a portion of the blade root 52 and a root bolt 74 coupled to and extending from the barrel nut 72 so as to project outwardly from a root end 76 of the blade root 52. By projecting outwardly from the root end 76, the root bolts 74 may generally be used to couple the blade root 52 to the hub 28 (e.g., via one of the pitch bearings 50), as will be described in greater detail below.

Referring now to FIG. 4, a partial, cross-sectional view of the rotor blade 22 shown in FIG. 3 is illustrated in accordance with aspects of the present subject matter, particularly illustrating the rotor blade 22 mounted onto the hub 20 via a pitch bearing 50. As shown, the pitch bearing 50 includes an outer bearing race 78, an inner bearing race 80, and a plurality of roller elements 82, 84 (e.g., a first row of balls 82 and a second row of balls 84) positioned radially between the outer and inner races 78, 80. The outer race 78 may generally be configured to be mounted to a hub flange 86 of the hub 28 using a plurality of hub bolts 88 and/or other suitable fastening mechanisms. Similarly, the inner race 80 may be configured to be mounted to the blade root 52 using the root bolts 74 of the root attachment assemblies 70 describe above.

As is generally understood, the inner race 80 may be configured to be rotated relative to the outer race 78 (e.g., via the roller elements 82, 84) to allow the pitch angle of each rotor blade 22 to be adjusted. As shown in FIG. 4, such relative rotation of the outer and inner races 78, 80 may be achieved using a pitch adjustment mechanism 30 mounted within a portion of the hub 20. In general, the pitch adjustment mechanism 30 may include any suitable components and/or may have any suitable configuration that allows the mechanism 30 to function as described herein. For example, as shown in the illustrated embodiment, the pitch adjustment mechanism 30 may include a pitch drive motor 90 (e.g., an electric motor), a pitch drive gearbox 92, and a pitch drive pinion 94. In such an embodiment, the pitch drive motor 90 may be coupled to the pitch drive gearbox 92 so that the motor 90 imparts mechanical force to the gearbox 92. Similarly, the gearbox 92 may be coupled to the pitch drive pinion 94 for rotation therewith. The pinion 94 may, in turn, be in rotational engagement with the inner race 80. For example, as shown in FIG. 4, a plurality of gear teeth 96 may be formed along the inner circumference of the inner race 80, with the gear teeth 96 being configured to mesh with corresponding gear teeth 98 formed on the pinion 94. Thus, due to meshing of the gear teeth 96, 98, rotation of the pitch drive pinion 94 results in rotation of the inner race 80 relative to the outer race 78 and, thus, rotation of the rotor blade 22 relative to the hub 20.

It should be appreciated that, as described herein, the pitch bearing 50 includes two rows of roller elements 82, 84 positioned between the outer and inner races 78, 80. In other embodiments, the pitch bearing 50 may include any other number of rows of roller elements, such as a single row or three or more rows of roller elements.

Referring now to FIG. 5, a perspective view of the pitch bearing 50 described above having a portion of the outer race 78 cut-away is illustrated in accordance with aspects of the present subject matter, particularly illustrating one embodiment of a sensor assembly 100 that may be installed within the pitch bearing 50 in order to detect the compressive loads transferred between adjacent roller elements 82, 84 of the bearing 50. As shown, one or more sensor assemblies 100 may be positioned radially between the inner and outer races 78, 80 of the pitch bearing 50, with each sensor assembly 100 replacing one of the roller elements 82, 84 of the bearing 50. In the illustrated embodiment, the pitch bearing 50 is shown as including a sensor assembly 100 installed between adjacent roller elements 82, 84 of each of the first and second rows of roller elements 82, 84. However, in other embodiments, the pitching bearing 50 may simply include a single sensor assembly 100 installed between adjacent roller elements 82, 84 of the first or second row of roller elements 82, 84. In addition, it should be appreciated that the pitch bearing 50 may also include multiple sensor assemblies 100 installed within each row of roller elements 82, 84, such as by including two or more sensor assemblies 100 installed within the first row of roller elements 82 and/or two or more sensor assemblies 100 installed within the second row of sensor elements 84.

Referring now to FIGS. 6-8, various views of one of the sensor assemblies 100 shown in FIG. 5 are illustrated in accordance with aspects of the present subject matter. Specifically, FIG. 6 illustrates a close-up view of a portion of the pitch bearing 50 shown in FIG. 5, particularly illustrating one of the sensor assemblies 100 installed between adjacent roller elements 84 of the bearing 50. Additionally, FIG. 7 illustrates a cross-sectional view of the sensor assembly 100 shown in FIG. 6 in a compressed or loaded state and FIG. 8 illustrates a cross-sectional view of the sensor assembly 100 in a non-compressed or unloaded state.

As indicate above, the sensor assembly 100 may be configured to be positioned between adjacent roller elements 84 of the pitch bearing 50, such as between a first roller element 84A and a second roller element 84B (shown in dashed lines in FIGS. 7 and 8). As shown, the sensor assembly 100 may include first and second housing components 102, 104 configured to be positioned directly adjacent to the first and second roller elements 84A, 84B, respectively and a load sensor 106 housed between the first and second housing components 102, 104. In addition, the sensor assembly 100 may include first and second backing plates 108, 110 positioned at least partially between the load sensor 106 and the first and second housing components 102, 104. For example, as shown in FIGS. 7 and 8, the first backing plate 108 may extend at least partially between the first housing component 102 and the load sensor 106 and the second backing plate 110 may extend at least partially between the second housing component 104 and the load sensor 106.

In general, the first and second housing components 102, 104 may form the outer circumferential portions of the sensor assembly 100 and, thus, may be configured to directly contact the adjacent roller elements 84A, 84B. For instance, as shown in FIGS. 7 and 8, the first housing component 102 may define a first outer circumferential surface 112 configured to contact the first roller element 84A and the second housing component 104 may define a second outer circumferential surface 114 configure to contact the second roller element 84B. In several embodiments, each of the outer circumferential surfaces 112, 114 may be configured to define a curved profile that generally corresponds to or is complementary of the radius of curvature of the roller elements 84A, 84B. For example, as shown in FIGS. 7 and 8, each outer circumferential surface 112, 114 corresponds to a concavely curved surface that matches the radius of curvature of the adjacent roller element 84A, 84B. As such, the roller elements 84A, 84B may be seated flush against the outer circumferential surfaces 112, 14 when the roller elements 84A, 84B are compressed towards one another during operation of the wind turbine 10.

Additionally, in several embodiments, an inner circumferential surface 116 of each housing component 104, 104 may be configured to define a suitable feature(s) for receiving a portion(s) of the adjacent backing plate 108, 110 of the sensor assembly 100. For example, as shown in FIGS. 7 and 8, the outer circumferential surface 116 of the first housing component 102 may define a first recessed section 118 configured to receive at least a portion of a first outer wall 120 of the first backing plate 108. Similarly, the outer circumferential surface 116 of the second housing component 104 may define a second recessed section 122 configured to receive at least a portion of a second outer wall 124 of the second backing plate 110. As such, each backing plate 108, 110 may be at least partially received within the adjacent housing component 102, 104.

It should be appreciated that the housing components 102, 104 may generally be formed from any suitable material that allows the components 102, 104 to function as described herein. In several embodiments, it may be desirable to form the housing components 102, 104 from a relatively strong material having a relatively low coefficient of friction. For instance, suitable materials may include, but are not limited to, glass-filled nylon materials and zinc die cast materials.

Referring still to FIGS. 6-8, the backing plates 108, 110 of the disclosed sensor assembly 100 may generally be configured to extend inwardly from the outer housing components 102, 104 so as to at least partially encase or surround the load sensor 106. Specifically, as shown in FIGS. 7 and 8, the first backing plate 108 may include a first sidewall 130 extending inwardly from the first outer wall 120 towards the second backing plate 110. Similarly, the second backing plate 110 may include a second sidewall 132 extending inwardly from the second outer wall 120 towards the first backing plate 108. As such, the outer walls 120, 122 and sidewalls 130, 132 of the backing plates 108, 110 may generally define an inner cavity 134 (FIG. 8) configured to receive the load sensor 106.

By configuring the backing plates 108, 110 as separate components, the plates 108, 110 may be configured to move relative to one another as the roller elements 84A, 84B are circumferentially loaded and unloaded. Specifically, as shown in FIG. 7, when the roller elements 84A, 84B are being compressed inwardly against the housing components 102, 104 (as indicated by arrows 140), the backing plates 108, 110 may be moved inwardly towards one another such that a gap 142 defined between the opposed sidewalls 130, 132 of the backing plates 108, 110 is reduced. Moreover, as shown in FIG. 8, when the roller elements 84A, 84B are unloaded or otherwise move apart from one another (as indicated by arrows 144), the backing plates 108, 110 may similarly move away from one another such that the gap 142 defined between the sidewalls 130, 132 is increased.

It should be appreciated that the backing plates 108, 110 may generally be formed from any suitable material that allows the plates 108, 110 to function as described herein. However, in a particular embodiment, the backing plates 108, 110 may be formed from a relatively stiff, rigid material, such as a metal material. Such a stiff, rigid material may provide for a uniform distribution of the loads being transferred through plates 108, 110 to the load sensor 106 as the roller elements 84A, 84B compress the sensor assembly 100 during operation of the wind turbine 10.

Additionally, as shown FIGS. 7 and 8, the sensor assembly 100 may also include one or more plate connectors 150 coupled between the first and second backing plates 108, 110 that allow the plates 108, 110 to move relative to one another across a given range of travel as the roller elements 84A, 84B are circumferentially loaded and unloaded. Specifically, in several embodiments, the plate connector(s) 150 may be configured to bend, flex or otherwise deform as the roller elements 84A, 84B are circumferentially loaded to allow the backing plates 108, 110 to move towards one another due to compression by the roller elements 84A, 84B. For example, as shown in FIG. 7, the plate connector(s) 150 may deform outwardly as the gap 142 defined between the backing plates 108, 110 is decreased. In addition, the plate connector(s) 150 may be configured to maintain the backing plates 108, 110 within a given circumferential distance of one another as the roller elements 84A, 84B are circumferentially unloaded. For instance, as shown in FIG. 8, as the first and backing plates 108, 110 separate from one another, the plate connector(s) 150 may straighten out across the gap 142 defined between the backing plates 108, 110 and prevent further outward motion of the plates 108, 110.

It should be appreciated that the plate connector(s) 150 may generally correspond to any suitable connector or coupling means that allows the connector(s) 150 to function as described herein. For instance, in one embodiment, the plate connector(s) 150 may correspond to one or more strip(s) of material coupled between the first and second backing plates 108, 110. In such an embodiment, the strip(s) of material may correspond to a strip of elastic or flexible material that allows the connector(s) 150 to deform as the backing plates 108, 110 move closer to one another and straighten out as the plates 108, 110 move away from one another, such as a nichrome strip or a strip of spring steel. Alternatively, the plate connector(s) 150 may have any other suitable configuration. For instance, in another embodiment, the plate connector(s) 150 may correspond to a rigid member coupled to the first backing plate 108 that extends outwardly from such plate 108 so as to circumferentially overlap the second backing plate 110. In such an embodiment, the rigid member may define a slot therein configured to receive a corresponding projection extending outwardly from the second backing plate 110 so as to allow the backing plates 108, 110 to move relative to one another while maintaining the spacing between the plates 108, 110 within a predetermined range of travel.

Additionally, as indicated above, the sensor assembly 100 may also include a load sensor 106 positioned between the first and second backing plates 108, 110. In general, the load sensor 106 may correspond to any suitable sensor(s) and/or sensing device(s) that provides an indication of the compressive load(s) being transmitted between adjacent roller elements 84, 86 of the pitch bearing 50 during operation of the wind turbine 10. For example, in one embodiment, the load sensor 106 may correspond to a compressive load cell. In such an embodiment, when the housing components 102, 104 and backing plates 108, 110 are compressed together as the roller elements 84A, 84B are circumferentially loaded, the load sensor 106 may measure the compressive load transferred through the sensor assembly 100, thereby providing an indication of the compressive load(s) being transmitted between the roller elements 84A, 84B. In other embodiments, the load sensor 106 may correspond to any other suitable sensor(s) and/or sensing device(s), such as a strain gauge sensor(s) and/or the like.

As indicated above, the present subject matter is also directed to a system 180 (FIG. 8) for monitoring bearing loads within a wind turbine 10. In general, the system 180 may include a bearing (e.g., the pitch bearing 50), one or more sensor assemblies 100 installed within the bearing and a controller (e.g., the turbine controller 26) for monitoring the load measurements received from the sensor assembly(ies) 100. For example, as shown in FIG. 8, the load sensor 106 of the sensor assembly 100 may, in several embodiments, be communicatively coupled to the turbine controller 26 via a suitable wired or wireless communications link (indicated by dashed line 182 in FIG. 8). For instance, a communicative cable or coupling may be provided between the load sensor 106 and the turbine controller 26. Alternatively, the load sensor 106 may include or be coupled to a suitable component(s) (e.g., a wireless antenna) configured to allow the sensor 106 to communicate with the turbine controller 26 via a wireless connection using any suitable wireless communications protocol.

By receiving the load measurements from the load sensor 106, the turbine controller 26 may be configured to monitor the compressive loads occurring within the bearing 50 relative to a predetermined maximum load threshold defined for such bearing 50. For instance, a load threshold may be defined for the bearing 50 that corresponds to a compressive load at which it is believed that an appropriate corrective action should be implemented in order to reduce the bearing loads and prevent damage to the bearing 50. In the event that the monitored compressive load exceeds the predetermined load threshold, the controller 26 may be configured to automatically adjust the operation of the wind turbine 10 in a manner that reduces the compressive load(s). For example, in one embodiment, the controller 26 may be configure to adjust the manner in which the rotor blades 22 are being pitched in order to reduce the compressive load(s), such as by reducing the magnitude and/or frequency of the pitching of the blades 22 by adjusting the control signal(s) being transmitted to the pitch adjustment mechanism(s) 30. Alternatively, the controller 26 may be configured to implement any other suitable corrective action intended to reduce the compressive loads within the bearing 50, such as by yawing the nacelle 16 in order to adjust the angular orientation of the nacelle 16 relative to the wind.

As indicated above, the turbine controller 26 may generally correspond to a computing device and/or any other suitable processing unit. Thus, in several embodiments, the controller 26 may include one or more processor(s) 184 (FIG. 8) and associated memory device(s) 186 (FIG. 8) configured to perform a variety of computer-implemented functions (e.g., performing the methods, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 186 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 186 may generally be configured to store suitable computer-readable instructions that, when implemented by the processor(s) 184, configure the controller 26 to perform various functions including, but not limited to, monitoring the compressive loads occurring within the pitch bearing 50 and controlling the operation of the wind turbine 10 based on such monitored loads. In addition, the controller 26 may also include any other suitable components, such as a communications module (not shown) to facilitate communications between the controller 26 and the various components of the wind turbine 10. For instance, the communications module may include a sensor interface (e.g., one or more analog-to-digital converters) to permit the signals transmitted by the load sensor 106 to be converted into signals that can be understood and processed by the processors 184.

It should be appreciated that, although the disclosed sensor assemblies 100 have been described herein as being installed within the pitch bearing 50 of a wind turbine 10, the sensor assemblies 100 may generally be installed within any suitable wind turbine bearing. For instance, in one embodiment, one or more sensor assemblies 100 may be installed with the yaw bearing 42 of the wind turbine 10.

As indicated above, the present subject matter is also directed to a method for monitoring loads within a bearing of a wind turbine. In one embodiment, the method may include receiving a signal(s) from a sensor assembly installed between adjacent roller elements of the bearing, with the signal(s) being associated with a compressive load transferred between the adjacent roller elements. For example, as indicated above, the turbine controller 26 may be configured to receive load measurement signals from the load sensor 106 that area associated with the compressive load(s) within the bearing 50. In addition, the method may include comparing the compressive load to a predetermined load threshold defined for the bearing and, if the compressive load exceeds the predetermined load threshold, adjusting the operation of the wind turbine so as to reduce the compressive load to a level below the predetermined load threshold.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A bearing for a wind turbine, the bearing comprising:
   an outer race;
   an inner race;
   a plurality of roller elements positioned radially between the inner and outer races, the plurality of roller elements including a first roller element and a second roller element; and
   a sensor assembly positioned between the first and second roller elements,
      a first housing component positioned adjacent to the first roller element;
      a second housing component positioned adjacent to the second roller element; and
      a load sensor positioned between the first and second housing components,
   wherein, when the sensor assembly is compressed between the first and second roller elements during operation of the wind turbine, the load sensor is configured to detect a compressive load transferred through the sensor assembly.

2. The bearing of claim 1, wherein the sensor assembly includes a first backing plate positioned at least partially between the first housing component and the load sensor and a second backing plate positioned at least partially between the second housing component and the load sensor.

3. The bearing of claim 2, wherein the first and second backing plates are configured to at least partially encase the load sensor.

4. The bearing of claim 2, further comprising at least one plate connector coupled between the first and second backing plates, wherein the at least one plate connector is configured to allow the first and second backing plates to move relative to one another across a range of travel defined between the first and second backing plates.

5. The bearing of claim 4, wherein the at least one plate connector comprises an elastic or flexible material coupled between the first and second backing plates, the elastic or flexible material being configured to deform as the first and second backing plates are moved towards one another.

6. The bearing of claim 1, wherein each of the first and second housing components includes an outer circumferential surface defining a curved profile, the curved profile generally corresponding to a radius of curvature of the first and second roller elements.

7. A system for monitoring bearing loads within a wind turbine, the system comprising:
   a bearing including an outer race, an inner race and a plurality of roller elements positioned radially between the inner and outer races, the plurality of roller elements including a first roller element and a second roller element;
   a sensor assembly including a load sensor positioned between the first and second roller elements, the load sensor being configured to detect a compressive load transmitted through the sensor assembly when the sensor assembly is compressed between the first and second roller elements; and
   a controller communicatively coupled to the sensor assembly, the controller being configured to receive load measurements from the load sensor, the load measurements being associated with the compressive load transmitted through the sensor assembly.

8. The system of claim 7, wherein the controller is configured to monitor the compressive load relative to a predetermined load threshold.

9. The system of claim 8, wherein, when the compressive load exceeds the predetermined load threshold, the controller is configured to adjust the operation of the wind turbine so as to reduce the compressive load.

10. The system of claim 9, wherein the controller is configured to adjust a manner in which at least one rotor blade of the wind turbine is being pitched in order to reduce the compressive load.

11. The system of claim 7, wherein the sensor assembly includes a first housing component positioned adjacent to the first roller element and a second housing component positioned adjacent to the second roller element, the load sensor being positioned between the first and second housing components.

12. The system of claim 11, further comprising a first backing plate positioned at least partially between the first housing component and the load sensor and a second backing plate positioned at least partially between the second housing component and the load sensor.

13. The system of claim 12, wherein the first and second backing plates are configured to at least partially encase the load sensor.

14. The system of claim 12, further comprising at least one plate connector coupled between the first and second backing plates, wherein the at least one plate connector is configured to allow the first and second backing plates to move relative to one another during operation of the wind turbine across a range of travel defined between the first and second backing plates.

15. The system of claim 14, wherein the at least one plate connector comprises an elastic or flexible material coupled between the first and second backing plates, the elastic or flexible material being configured to deform as the first and second backing plates are moved towards one another.

16. The system of claim 11, wherein each of the first and second housing components includes an outer circumferential surface defining a curved profile, the curved profile generally corresponding to a radius of curvature of the first and second roller elements.

17. The system of claim 7, wherein the bearing corresponds to a pitch bearing of the wind turbine.

18. A method for monitoring loads within a bearing of a wind turbine, the bearing including an outer race, an inner race and a plurality of roller elements positioned radially between the inner and outer races, the method comprising:

receiving, with a computing device, a signal from a sensor assembly associated with a compressive load transferred between a first roller element and a second roller element of the plurality of roller elements, the sensor assembly including a load sensor configured to detect the compressive load;

comparing, with the computing device, the compressive load to a predetermined load threshold defined for the bearing; and if the compressive load exceeds the predetermined load threshold, adjusting, with the computing device, the operation of the wind turbine so as to reduce the compressive load.

19. The method of claim 18, wherein adjusting the operation of the wind turbine comprising transmitting a control signal to a pitch adjustment mechanism of the wind turbine in order to adjust a manner in which at least one rotor blade of the wind turbine is being pitched.

* * * * *